(12) United States Patent
Cohen et al.

(10) Patent No.: US 12,458,178 B2
(45) Date of Patent: Nov. 4, 2025

(54) DISPOSABLE NON-SLIP BATH MAT WITH ANTI-MICROBIAL AND ANTI-SLIP PROPERTIES

(71) Applicant: Eric Cohen, Miami, FL (US)

(72) Inventors: Eric Cohen, Miami, FL (US); Victor Lee, Chino Hills, CA (US)

( * ) Notice: Subject to any disclaimer, the term of this patent is extended or adjusted under 35 U.S.C. 154(b) by 84 days.

(21) Appl. No.: 18/611,517

(22) Filed: Mar. 20, 2024

(65) Prior Publication Data

US 2025/0160574 A1 May 22, 2025

Related U.S. Application Data

(60) Provisional application No. 63/601,849, filed on Nov. 22, 2023.

(51) Int. Cl.
| | |
|---|---|
| *A47K 3/00* | (2006.01) |
| *A01N 25/24* | (2006.01) |
| *A01N 31/16* | (2006.01) |
| *A01N 59/16* | (2006.01) |
| *A01N 59/20* | (2006.01) |
| *A01P 1/00* | (2006.01) |

(52) U.S. Cl.
CPC .............. *A47K 3/002* (2013.01); *A01N 25/24* (2013.01); *A01N 31/16* (2013.01); *A01N 59/16* (2013.01); *A01N 59/20* (2013.01); *A01P 1/00* (2021.08)

(58) Field of Classification Search
CPC ........... A47K 3/002; A01P 1/00; A01N 25/24; A01N 31/16; A01N 59/16; A01N 59/20
USPC ...................... 4/581–583, 559, 605
See application file for complete search history.

(56) References Cited

U.S. PATENT DOCUMENTS

| | | | | |
|---|---|---|---|---|
| 1,190,179 | A * | 7/1916 | Livingston | A47K 3/002 4/583 |
| 2,217,821 | A * | 10/1940 | Shiner | A47K 3/002 4/583 |
| 2007/0044261 | A1* | 3/2007 | Bolton | A47K 3/002 4/606 |
| 2009/0241978 | A1* | 10/2009 | Moretti | A47K 7/026 4/581 |
| 2010/0081002 | A1* | 4/2010 | Carter-Patterson | A47K 3/002 428/474.4 |

* cited by examiner

*Primary Examiner* — Tuan N Nguyen

(57) ABSTRACT

A disposable bath mat includes a body made of Polyethylene Vinyl Acetate (PEVA) material, wherein the body has a top surface, a bottom surface, and a thickness between 0.8 mm and 1.0 mm, a plurality of drainage holes in the body configured for allowing water to drain therethrough. an anti-microbial substance integrated into the PEVA material, a non-slip texture formed on the top surface of the body, an adhesive layer applied to the bottom surface of the body, wherein the adhesive layer is configured to adhere the bath mat to a surface and allow for easy removal without leaving residue, a removable sheet placed on top of the adhesive layer, wherein the removable is configured to allow for easy removal to expose the adhesive layer.

20 Claims, 9 Drawing Sheets

DISPOSABLE NON-SLIP BATH MAT WITH ANTI-MICROBIAL AND ANTI-SLIP PROPERTIES

CROSS-REFERENCE TO RELATED APPLICATIONS

This patent application claims priority to provisional patent application 63/601,849 filed Nov. 22, 2023. The subject matter of provisional patent application 63/601,849 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed embodiments relate generally to household goods, and more specifically, to bath mats for use in the bathroom.

BACKGROUND

Bath mats are a common household item that serves a crucial role in the bathroom environment. Bath mats are designed to provide a soft and comfortable surface for individuals to step on while entering, exiting and using a shower or bath. Their primary function is to enhance safety by preventing slips and falls on wet and potentially slippery bathroom floors. Bath mats come in various shapes, sizes, and materials, offering consumers a wide range of choices to match their bathroom decor and personal preferences.

However, despite their widespread use, current bath mats have some inherent shortcomings that can be frustrating for users. One significant issue is their tendency to slip and not stay securely in place on the floor of the bathtub or shower. This can be particularly hazardous, as a displaced bath mat can cause a person to lose their balance, leading to accidents and injuries. Many users have experienced the annoyance of constantly repositioning their bath mats to maintain safety.

Another concern with traditional bath mats is their susceptibility to bacterial growth. The moist and humid environment of the bathroom creates an ideal breeding ground for bacteria and mold, and bath mats, often made of fabric or rubber, can trap moisture underneath them. Over time, this trapped moisture can lead to the development of unpleasant odors and potentially harmful bacteria. Cleaning these mats can be a challenge, as they often require frequent washing and drying to prevent bacterial buildup.

In light of these issues, a need exists to overcome the problems with the prior art as discussed above, and particularly for innovation in bath mat design and materials to address the problems of slipping and bacterial growth.

SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The disclosed embodiments are directed to a two-piece disposable bath mat kit, comprising a first piece comprising a main bath mat configured for placement on bath tub or shower stall floor, and a second piece comprising a side bath mat configured for placement on a rim of the bath tub or shower stall, and, wherein the first piece and the second piece each comprise a body made of Polyethylene Vinyl Acetate (PEVA) material, wherein the body has a top surface, a bottom surface, and a thickness between 0.8 mm and 1.0 mm, a plurality of drainage holes in the body configured for allowing water to drain therethrough, an anti-microbial substance integrated into the PEVA material, a non-slip texture formed on the top surface of the body, an adhesive layer applied to the bottom surface of the body, wherein the adhesive layer is configured to adhere the bath mat to a surface and allow for easy removal without leaving residue, and, a removable sheet placed on top of the adhesive layer, wherein the removable is configured to allow for easy removal to expose the adhesive layer.

The disclosed embodiments are also directed to a disposable bath mat comprising a body made of Polyethylene Vinyl Acetate (PEVA) material, wherein the body has a top surface, a bottom surface, and a thickness between 0.8 mm and 1.0 mm, a plurality of drainage holes in the body configured for allowing water to drain therethrough, an anti-microbial substance integrated into the PEVA material, a non-slip texture formed on the top surface of the body, an adhesive layer applied to the bottom surface of the body, wherein the adhesive layer is configured to adhere the bath mat to a surface and allow for easy removal without leaving residue, a removable sheet placed on top of the adhesive layer, wherein the removable is configured to allow for easy removal to expose the adhesive layer.

To the accomplishment of the above and related objects, claimed subject matter may be embodied in the form illustrated in the accompanying drawings, attention being called to the fact, however, that the drawings are illustrative only, and that changes may be made in the specific construction illustrated and described within the scope of the appended claims. The foregoing and other features and advantages of the claimed embodiments will be apparent from the following more particular description of the preferred embodiments, as illustrated in the accompanying drawings.

BRIEF DESCRIPTION OF THE DRAWINGS

The accompanying drawings, which are incorporated in and constitute part of this specification, illustrate embodiments of the claimed subject matter and together with the description, serve to explain the principles of the disclosed embodiments. The embodiments illustrated herein are presently preferred, it being understood, however, that the claimed subject matter is not limited to the precise arrangements and instrumentalities shown, wherein:

DETAILED DESCRIPTION

Figure 1:
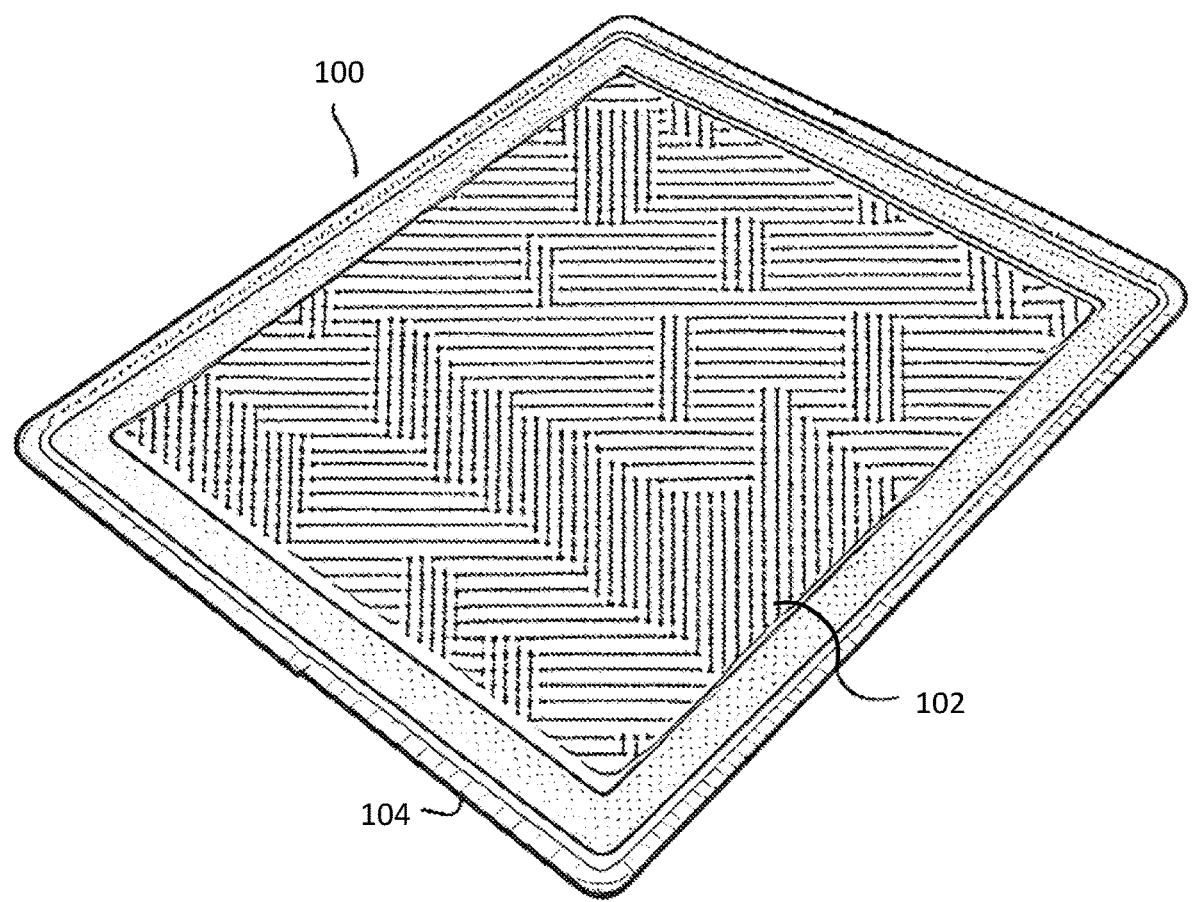
FIG. 1 is a drawing depicting the disposable non-slip bath mat with anti-microbial and non-slip properties, according to one embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The claimed disposable non-slip bath mat and kit represents a significant improvement over prior art in the realm of bathroom safety and hygiene. The claimed product combines the practicality of a non-slip surface with the added benefits of anti-microbial properties, offering a multifaceted solution to common bathroom concerns. One of the primary advantages of this bath mat and kit is its composition of Polyethylene Vinyl Acetate (PEVA), a material that is not only eco-friendly but also inherently safer for use in environments like bathrooms. Unlike traditional PVC mats, PEVA is chlorine-free, reducing the release of harmful chemicals and odors. This makes the claimed bath mat and kit more environmentally responsible and healthier for indoor air quality.

The anti-microbial properties of the claimed mat and kit set it apart from conventional bath mats. By incorporating anti-microbial agents such as silver ions or zinc oxide into the PEVA material, the claimed mat and kit actively resists the growth of bacteria, mold, and fungi. This feature is particularly advantageous in damp bathroom environments where microbes tend to thrive. Regular bath mats can become breeding grounds for bacteria and mold, leading to unpleasant odors and potential health risks. The anti-microbial aspect of the claimed bath mat and kit addresses these issues, offering a more hygienic solution. The claimed mat and kit is attached to the floor of the bathtub or shower stall using an adhesive and the mat and kit is completely sealed around the edge with said adhesive material, which prevents dirt, debris or water residue from accumulating between the mat and the floor. This feature reduces or eliminates the potential growth of bacteria, mold and fungus between the mat and the floor.

Additionally, the non-slip texture of the claimed mat and kit is a critical safety feature. The top surface is designed with a gravel, square or diamond pattern, providing excellent traction even when wet. This design significantly reduces the risk of slips and falls in the bathroom, a common concern especially for households with elderly or young children. The ease of installation and removal due to its adhesive bottom further enhances its practicality. Unlike traditional mats that can move or bunch up, posing a tripping hazard, this adhesive design stays firmly in place yet can be easily removed without leaving any residue.

Furthermore, the disposable nature of the claimed mat and kit introduces a convenience factor that is absent in most traditional mats. Instead of requiring regular cleaning, which can be labor-intensive and ineffective in completely removing microbes, the claimed mat and kit can be simply discarded once it begins to show wear or lose its adhesive quality. This feature ensures that the bathroom remains hygienic without the need for continual maintenance, a significant time and effort saver.

Furthermore, conventional rubber mats, when lifted to be hung to dry when wet, can weigh 4 pounds or more. This is a tremendous strain on the back, arms and shoulders of older people who must clean them many times a month. This extra weight and many cleanings also raises the extra labor costs for nursing home care companies and hotel maids. The claimed bath mat and kit weighs only a quarter of a pound, offering a great competitive marketing advantage and comforting its customers. Another advantage over the prior art is that conventional rubber mats use suction cups to stick to the porcelain bath tubs which can cause damage, peeling, stains and discoloration to the surface, which is avoided by the claimed bath mat.

Additionally, the disclosed embodiments are directed to a two-piece disposable bath mat kit, comprising a first piece comprising a main bath mat configured for placement on bath tub or shower stall floor, and a second piece comprising a side bath mat configured for placement on a rim of the bath tub or shower stall. This feature ensures that the full area around a bathtub or shower stall user, i.e., the bathtub/shower stall and the rim around the same, is covered by the claimed two-piece disposable bath mat kit, therefore reducing or eliminating the possibility that the user can slip an any such area that he/she will be using.

In conclusion, the claimed disposable non-slip bath mat and kit with anti-microbial properties is a notable advancement over prior art. It offers a safer, more hygienic, eco-friendly, and convenient option for bathroom safety and cleanliness. Its innovative use of PEVA material, combined with anti-microbial additives and a unique non-slip design, makes it a superior choice for households, healthcare facilities, and hospitality settings seeking a practical and effective solution to bathroom safety and hygiene.

The claimed embodiments provide a product designed to enhance safety and convenience in bathrooms. The claimed embodiments are crafted using PEVA (Polyethylene Vinyl Acetate) plastic, a material chosen for its eco-friendly and safety attributes. The claimed mat's surface is designed with a texture, such as a gravel or diamond texture, offering a non-slip experience during showering or bathing. Additionally, its adhesive bottom layer ensures a non-skid function when placed on bathtub or shower floors, which prevents movements of the claimed mat during use. In one embodiment, the adhesive layer comprises a biodegradable adhesive material, ensuring that the mat remains eco-friendly throughout its lifecycle, including disposal, thereby aligning with the environmental benefits provided by the use of PEVA material.

In terms of construction, the claimed embodiments comprise a thin sheet of PEVA material, typically ranging in thickness from 0.8 mm to 1.0 mm, although this can vary. The utilized PVC-free, non-chlorinated material is odorless, biodegradable, and adds to the claimed product's eco-friendly nature. The standard size for the claimed mat is 16"×28", but this can be adjusted to suit different applications. The bottom layer of the claimed mat and kit features a removable adhesive material with an easily peelable backing paper, enabling simple and secure application to clean, dry surfaces.

The front side of the claimed mat and kit may be designed to provide a comfortable yet firm grip with its texture, such as a gravel or diamond texture, reducing the risk of slips in wet conditions. The claimed product's antimicrobial properties, combined with its chlorine-free composition, further enhance user safety. The claimed embodiments may be available in various colors, including white, transparent, or other hues to aid visibility for those with impaired eyesight, particularly the elderly. The claimed embodiments can also be customized with prints, patterns, or logos for retail and advertising purposes.

An additional feature of the claimed embodiments is the option to include punch-through holes or drainage holes, which prevent water drainage blockages in some bathtubs and shower cases. The drainage holes are configured to allow water to drain therethrough. This feature underscores the claimed product's thoughtful design, aimed at providing a safe, antimicrobial, non-slip, non-skid, maintenance-free, easy-to-set-up, and environmentally friendly solution for everyday bathroom use. Its economic and lightweight nature, combined with a lifespan that lasts months under proper use, makes it a practical choice for a wide range of users, including households, nursing homes, and hospitals. The claimed mat and kit is designed for disposal once it begins to peel off, aligning with its eco-friendly and maintenance-free ethos.

Incorporating anti-microbial substances into the claimed bath mat and kit to combat microbes involves selecting agents that are not only effective against bacteria, mold, and fungi but can also be safely and effectively integrated into the PEVA material. Commonly used anti-microbial agents suitable for this purpose include silver ions or silver-based compounds, which are widely recognized for their potent anti-microbial properties and can be integrated into the PEVA material. Zinc oxide is another option, known for its effectiveness against a wide range of microorganisms and compatibility with polymers. Copper and its alloys, which have inherent anti-microbial properties, can be incorporated into materials to inhibit microbial growth.

Triclosan is a synthetic antimicrobial agent that has been used in various consumer products and can be integrated into the claimed bath mat and kit. Quaternary ammonium compounds, effective against a broad spectrum of pathogens, can be integrated into the claimed bath mat and kit due to its anti-microbial effects. Titanium dioxide is also a potential additive, particularly effective when exposed to UV light. In addition to these synthetic options, organic anti-microbial agents and natural substances like certain plant extracts or essential oils may be used in combination with the PEVA material.

Incorporating fragrance-emitting substances into the claimed bath mat and kit to combat annoying or foul smells may also enhance the usability of the claimed products. The body of the mat and kit may be impregnated with a fragrance-emitting substance, which is released gradually over time to provide a pleasant aroma in the bathroom, thereby enhancing the user experience in addition to providing safety and antimicrobial properties. Also, a color-changing indicator may be integrated into the PEVA material, wherein the indicator is designed to change color in response to the accumulation of microbial activity or after a predetermined period of use, thereby signaling to the user when the mat should be replaced to maintain optimal hygiene and safety conditions.

FIG. 1 illustrates the disposable non-slip bath mat 100, featuring anti-microbial properties and a top surface pattern 102 (comprising diagonal lines) for enhanced traction, preventing slippage when in use. Additionally, it includes an edge 104 designed for easy handling and placement.

Figure 2:
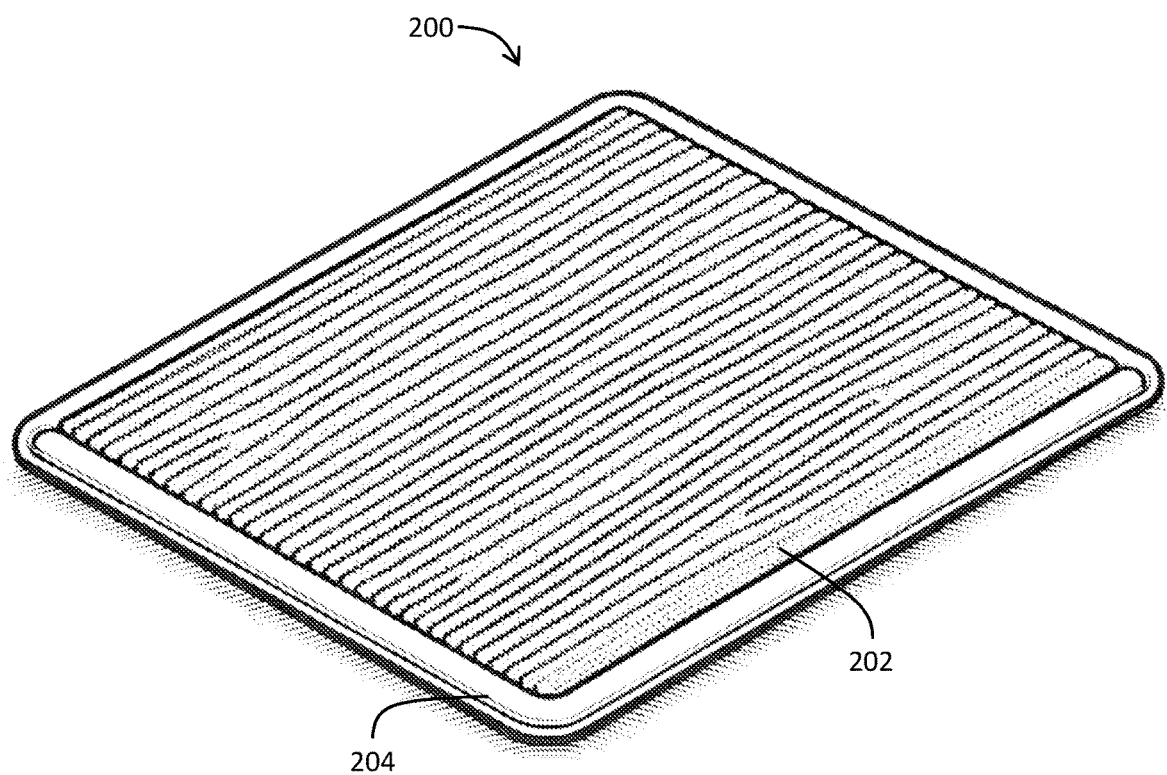
FIG. 2 is a drawing depicting the disposable non-slip bath mat with anti-microbial and non-slip properties, according to another embodiment.

In FIG. 2, another variant of the bath mat 200 is shown, also equipped with anti-microbial and non-slip features. It displays a distinct pattern 202 (comprising straight parallel lines) on its surface for improved grip and an edge 204, simplifying its pickup and positioning.

Figure 3:
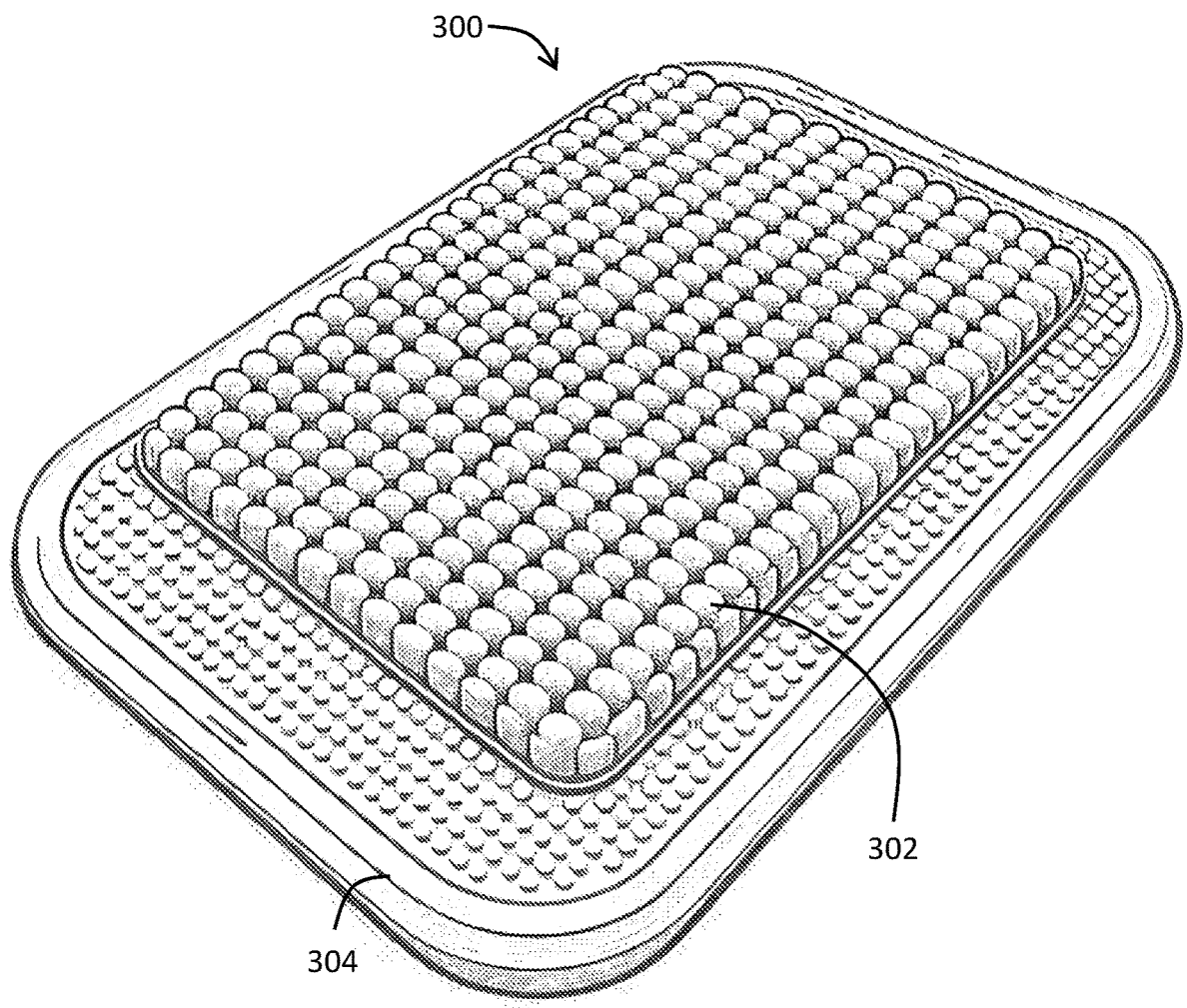
FIG. 3 is a drawing depicting the disposable non-slip bath mat with anti-microbial and non-slip properties, according to one embodiment.
Figure 4:
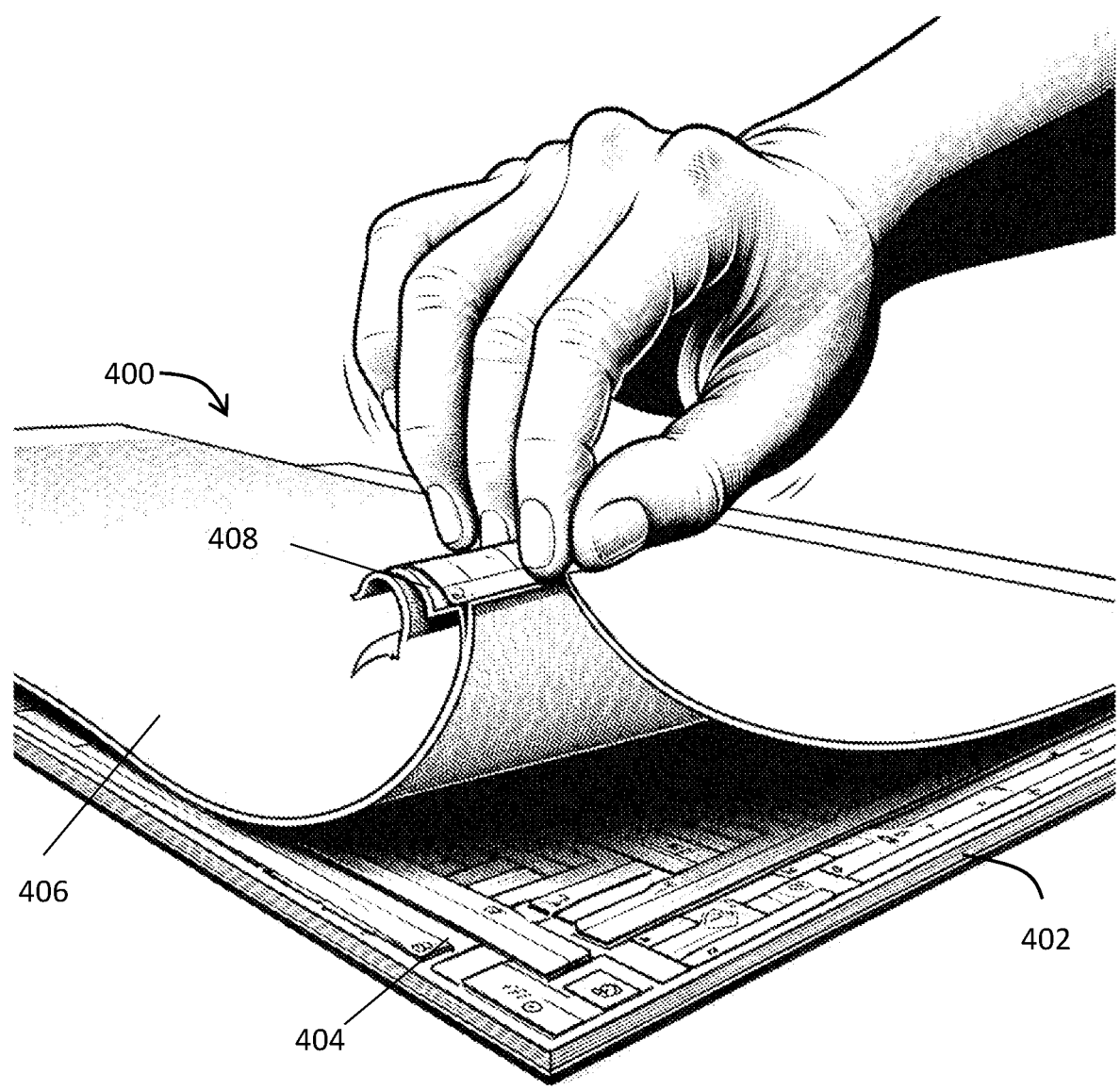
FIG. 4 is a drawing depicting the disposable non-slip bath mat with anti-microbial and non-slip properties, showing a backing being removed, according to one embodiment.

FIG. 3 presents a further embodiment of the bath mat 300, maintaining the anti-microbial and non-slip characteristics. This version has a unique top surface pattern 302 (comprising a series of evenly placed tufts) for steady footing and an edge akin to that in FIG. 2, facilitating effortless lifting and laying FIG. 4 is a drawing depicting the disposable non-slip bath mat 400 with anti-microbial and non-slip properties, showing a backing 406 being removed, according to one embodiment. FIG. 4 shows that the bath mat 400, shown facing downwards, includes the portion 402 or body configured for being stepped on by the user. The bottom surface 404 of the body includes an adhesive layer configured for sticking to the floor of a shower stall or bathtub. On top of the bottom surface 404 is a paper backing 406 that is configured for protecting the adhesive layer until it is ready to be applied. The backing 406 has a sticker 408 or tab that provides an element that may be easily handled and grabbed by a user utilizing his hands to peel the backing 406 off of the adhesive layer.

Figure 5:
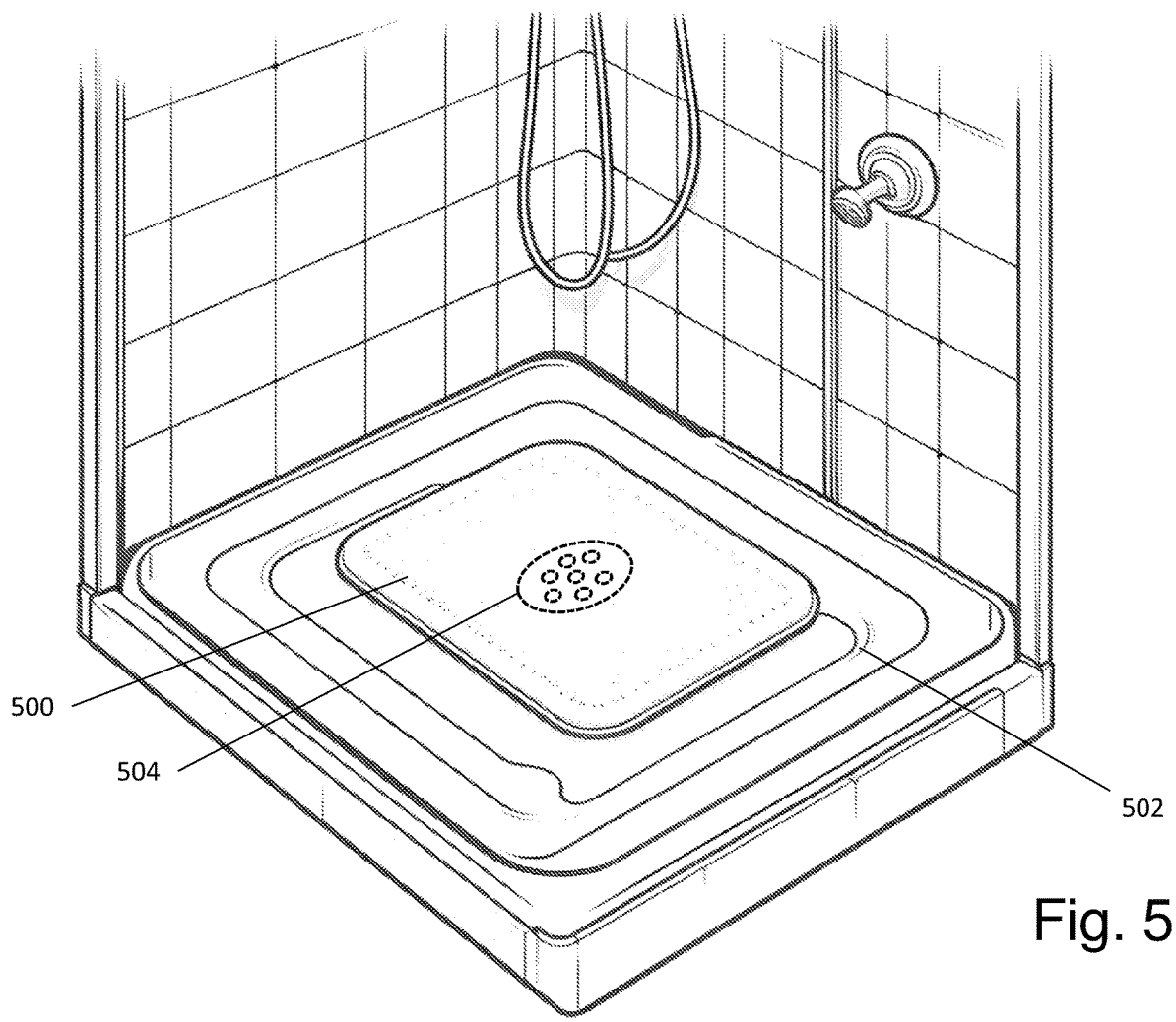
FIG. 5 is a drawing depicting the disposable non-slip bath mat with anti-microbial and non-slip properties on the floor of a shower stall, according to one embodiment.
Figure 6:
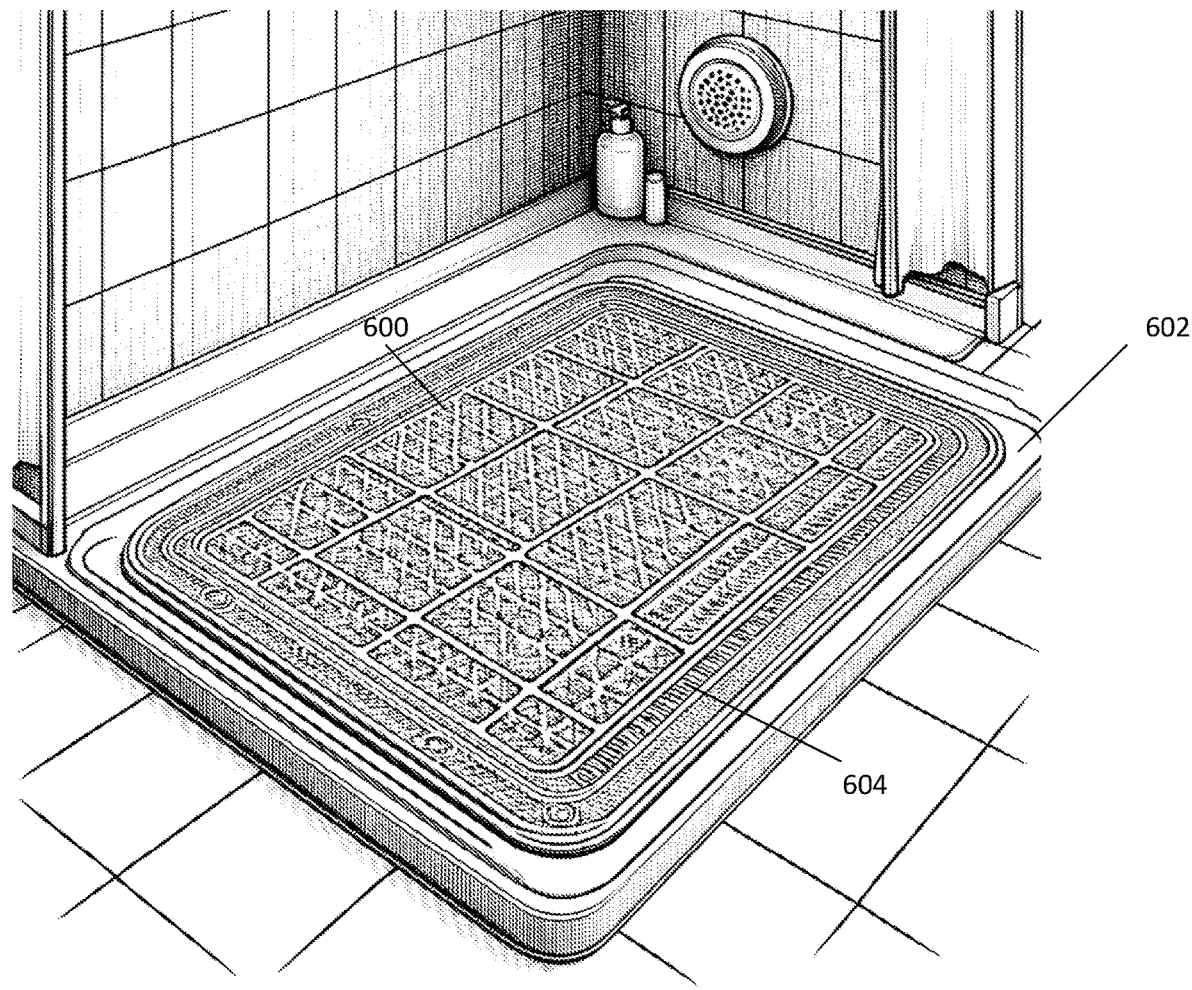
FIG. 6 is a drawing depicting the disposable non-slip bath mat with anti-microbial and non-slip properties on the floor of a shower stall, according to one embodiment.

FIG. 5 showcases an embodiment of the disposable non-slip bath mat 500, designed for use in a shower stall 502. This mat integrates anti-microbial elements and a non-slip surface for enhanced safety and hygiene. FIG. 5 also shows that even though the bath mat 500 sits on top of the shower drain 504 (shown in dotted lines since it is occluded by the mat) the bath mat does not prevent water from draining into the shower drain since the bath mat contains drainage holes. Moving to FIG. 6, a similar bath mat 600 is illustrated in a different shower stall setting 602, retaining the key features of antimicrobial and non-slip properties. This variation is distinguished by its uniquely textured top surface 604 (a repeating pattern), specifically engineered to provide additional slip resistance.

Figure 7:
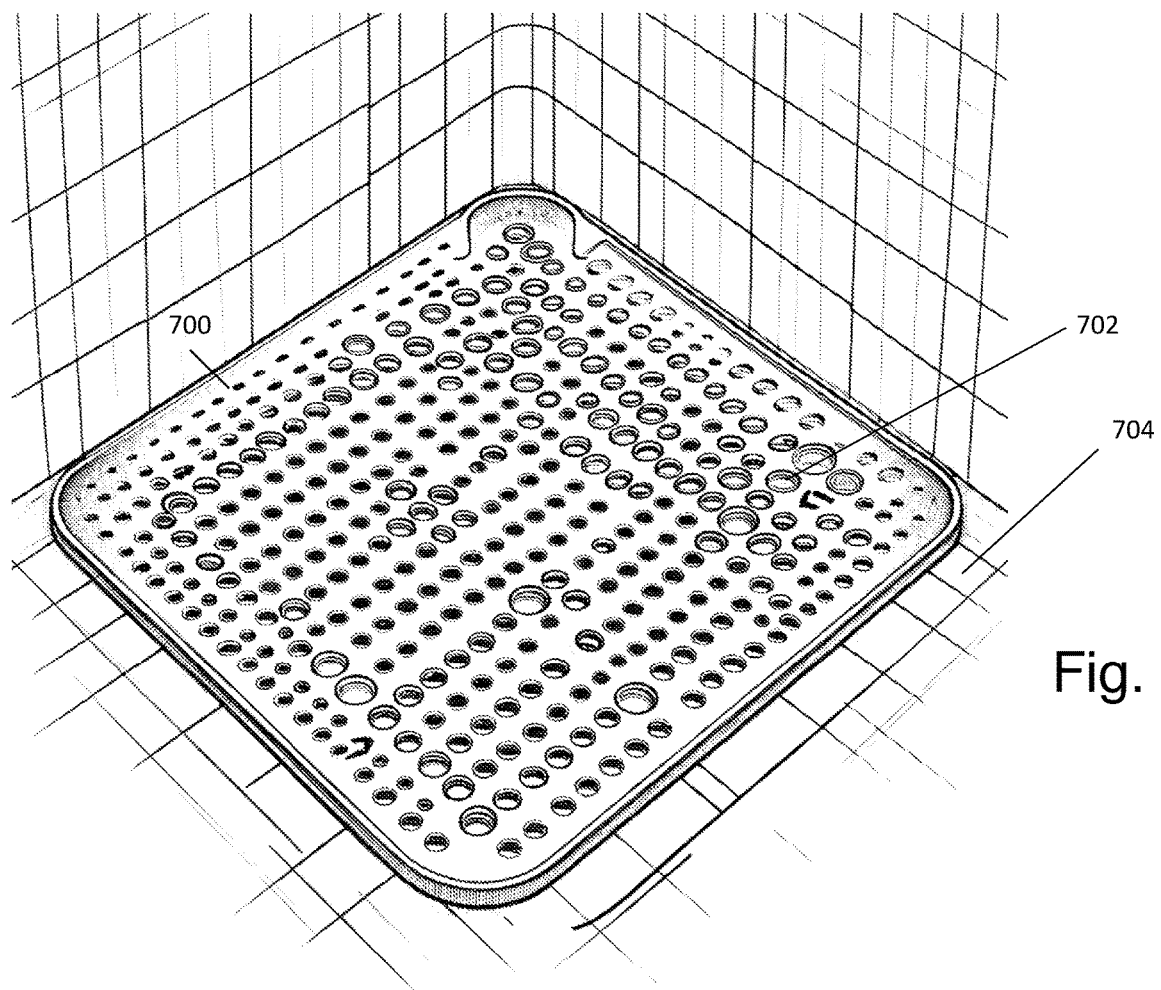
FIG. 7 is a drawing depicting the disposable non-slip bath mat with anti-microbial and non-slip properties on the floor of a shower stall, according to one embodiment.

Progressing to FIG. 7, the depiction shifts to yet another design iteration, the bath mat 700, situated within a shower stall 704. Like its predecessors, it combines anti-microbial and non-slip functionalities but stands out with its distinct textured top surface 702, crafted to further mitigate slipping risks. FIG. 7 also shows that the bath mat 700 does not prevent water from draining into the shower drain, due to the drainage holes in the mat.

A notable feature is the inclusion of multiple drain holes on the top surface. These holes are strategically placed to facilitate water drainage, ensuring that the mat remains effective in wet conditions and further enhancing the safety aspect by reducing the likelihood of water accumulation and potential slipping hazards.

Figure 8:
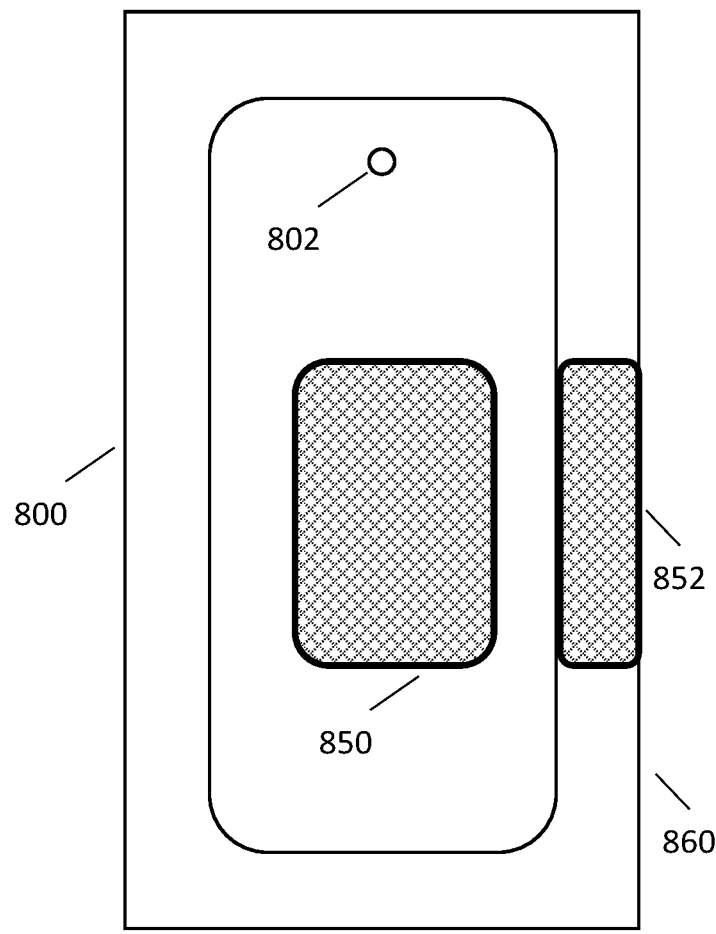
FIG. 8 is a drawing depicting a top view of a disposable non-slip bath mat kit with anti-microbial and non-slip properties on a bathtub, according to one embodiment.

FIG. 8 is a drawing depicting a top view of a disposable non-slip bath mat kit with anti-microbial and non-slip properties on a bathtub, according to one embodiment. FIG. 8 shows the disposable non-slip bath mat kit comprises a first piece comprising a main bath mat 850 configured for placement on the bath tub floor, and a second piece comprising a side bath mat 852 configured for placement on a rim 860 of the bath tub, i.e., the flat horizontal surface on the side wall of the bathtub. Note the side bath mat 852 is smaller than the main bath mat as it is configured for placement on a rim. Note also that the kit does not occlude the drain 802 of the bathtub 800. Further note that both pieces show a repeating diamond pattern on their top surface.

Figure 9:
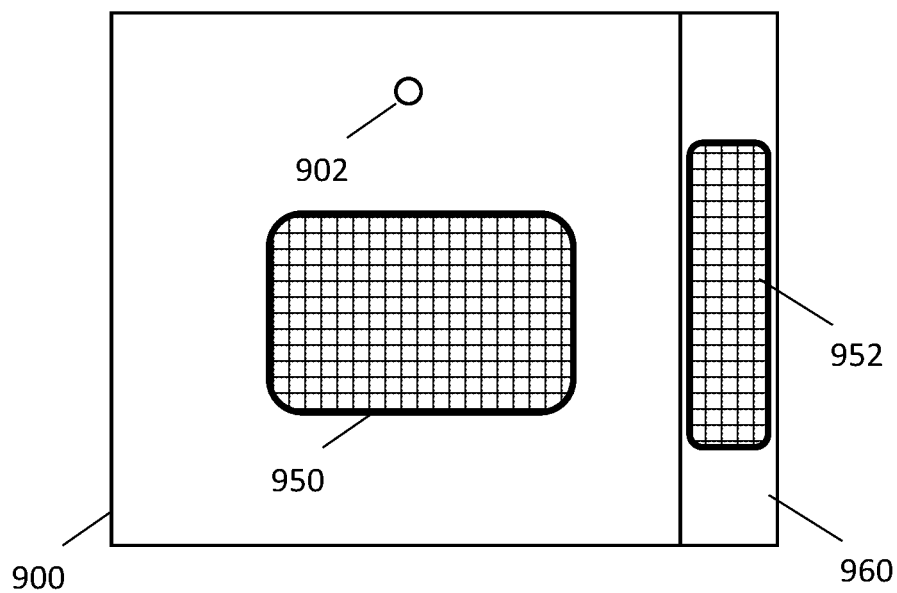
FIG. 9 is a drawing depicting a top view of a disposable non-slip bath mat kit with anti-microbial and non-slip properties on a shower stall, according to one embodiment.

FIG. 9 is a drawing depicting a top view of a disposable non-slip bath mat kit with anti-microbial and non-slip properties on a shower stall, according to one embodiment. FIG. 9 shows the disposable non-slip bath mat kit comprises a first piece comprising a main bath mat 950 configured for placement on the shower stall floor, and a second piece comprising a side bath mat 952 configured for placement on a rim 960 of the shower stall, i.e., the flat horizontal surface on the side wall of the shower stall. Note the side bath mat 952 is smaller than the main bath mat as it is configured for placement on a rim. Note also that the kit does not occlude the drain 902 of the shower stall 900. Further note that both pieces show a repeating square pattern on their top surface.

The claimed products may integrate a temperature-regulating system within the bath mat and kit that can adjust its surface temperature according to the ambient conditions or user preference. Utilizing phase change materials (PCMs) embedded within the mat's layers, this feature could provide a warming effect on colder days and a cooling sensation during warmer periods. The inclusion of a smart control mechanism, possibly through a mobile application, would allow users to set their desired temperature remotely, enhancing user comfort and distinguishing the product in the marketplace.

In another embodiment, the claimed products may incorporate a hydrophobic coating that repels water and prevents the absorption of liquids, coupled with UV light-emitting diodes (LEDs) embedded along the edges of the bath mat. The UV light would activate a photocatalytic coating on the mat's surface, enabling self-cleaning properties by breaking down organic compounds and bacteria, thus maintaining hygiene without the need for chemicals. This combination ensures the mat remains dry and hygienic, addressing concerns over mold and mildew buildup.

In a further embodiment, the claimed products may embed sensors within the bath mat and kit to monitor health-related metrics such as weight, posture, and balance. By analyzing pressure distribution as a person stands on the mat, it could assess posture and balance quality, offering feedback through a connected app. This feature would be particularly beneficial for elderly users or those undergoing physical rehabilitation, making the bath mat not only a safety device but also a health monitoring tool.

In yet another embodiment, the claimed products may include a lifespan and environmental impact indicator based on the degradation rate of the materials used. This feature could utilize color-changing fibers that visually indicate when the mat has reached the end of its optimal use life and needs to be recycled. Coupled with materials designed for easy recycling, this feature promotes environmental sustainability and encourages responsible disposal. In another embodiment, the claimed products may incorporate microencapsulation technology to infuse the bath mat with essential oils that are gradually released when pressure is applied. This feature could offer therapeutic benefits, such as stress reduction and mood improvement, enhancing the bathing experience. Users could select mats based on different aromatherapy blends, tailored to various needs and preferences.

Each of these figures collectively emphasizes the versatility of the bath mat's design, showing its adaptability to various shower stall configurations while consistently maintaining its core attributes of hygiene and safety. The variety in texture patterns and the incorporation of drain holes demonstrate a thoughtful approach to improving bathroom safety, marrying functional design with practical needs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A disposable bath mat comprising:
 a body made of Polyethylene Vinyl Acetate (PEVA) material, wherein the body has a top surface, a bottom surface, and a thickness between 0.8 mm and 1.0 mm;
 a plurality of drainage holes in the body configured for allowing water to drain therethrough;
 an anti-microbial substance integrated into the PEVA material;
 a non-slip texture formed on the top surface of the body;
 an adhesive layer applied to the bottom surface of the body, wherein the adhesive layer is configured to adhere the bath mat to a surface and allow for easy removal without leaving residue; and
 a removable sheet placed on top of the adhesive layer, wherein the removable is configured to allow for easy removal to expose the adhesive layer.

2. The disposable bath mat of claim 1, wherein the non-slip texture formed on the top surface of the body comprises a repeating pattern.

3. The disposable bath mat of claim 2, wherein the repeating pattern comprises either a diamond pattern or a square pattern.

4. The disposable bath mat of claim 1, wherein the non-slip texture formed on the top surface of the body comprises a gravel texture.

5. The disposable bath mat of claim 4, wherein the anti-microbial substance comprises a silver-based compound.

6. The disposable bath mat of claim 4, wherein the anti-microbial substance comprises a zinc ion-based compound.

7. The disposable bath mat of claim 4, wherein the anti-microbial substance comprises a copper-based compound.

8. The disposable bath mat of claim 4, wherein the anti-microbial substance comprises a triclosan based compound.

9. The disposable bath mat of claim 1, wherein the adhesive layer comprises a biodegradable adhesive material.

10. The disposable bath mat of claim 9, wherein the body is impregnated with a fragrance-emitting substance.

11. A two-piece disposable bath mat kit, comprising:
a first piece comprising a main bath mat configured for placement on bath tub or shower stall floor, and a second piece comprising a side bath mat configured for placement on a rim of the bath tub or shower stall; and
wherein the first piece and the second piece each comprise:
- a body made of Polyethylene Vinyl Acetate (PEVA) material, wherein the body has a top surface, a bottom surface, and a thickness between 0.8 mm and 1.0 mm;
- a plurality of drainage holes in the body configured for allowing water to drain therethrough;
- an anti-microbial substance integrated into the PEVA material;
- a non-slip texture formed on the top surface of the body;
- an adhesive layer applied to the bottom surface of the body, wherein the adhesive layer is configured to adhere the bath mat to a surface and allow for easy removal without leaving residue; and
- a removable sheet placed on top of the adhesive layer, wherein the removable is configured to allow for easy removal to expose the adhesive layer.

12. The two-piece disposable bath mat kit of claim 11, wherein the non-slip texture formed on the top surface of the body of the first piece and the second piece comprises a repeating pattern.

13. The two-piece disposable bath mat kit of claim 12, wherein the repeating pattern comprises either a diamond pattern or a square pattern.

14. The two-piece disposable bath mat kit of claim 11, wherein the non-slip texture formed on the top surface of the body of the first piece and the second piece comprises a gravel texture.

15. The two-piece disposable bath mat kit of claim 14, wherein the anti-microbial substance comprises a silver-based compound.

16. The two-piece disposable bath mat kit of claim 14, wherein the anti-microbial substance comprises a zinc ion-based compound.

17. The two-piece disposable bath mat kit of claim 14, wherein the anti-microbial substance comprises a copper-based compound.

18. The two-piece disposable bath mat kit of claim 14, wherein the anti-microbial substance comprises a triclosan based compound.

19. The two-piece disposable bath mat kit of claim 11, wherein the adhesive layer comprises a biodegradable adhesive material.

20. The two-piece disposable bath mat kit of claim 19, wherein the body of the first piece and the second piece is impregnated with a fragrance-emitting substance.

\* \* \* \* \*